Sept. 19, 1933.  B. C. SKINNER  1,927,100
FRUIT COLORING ROOM
Filed April 19, 1930  3 Sheets-Sheet 1
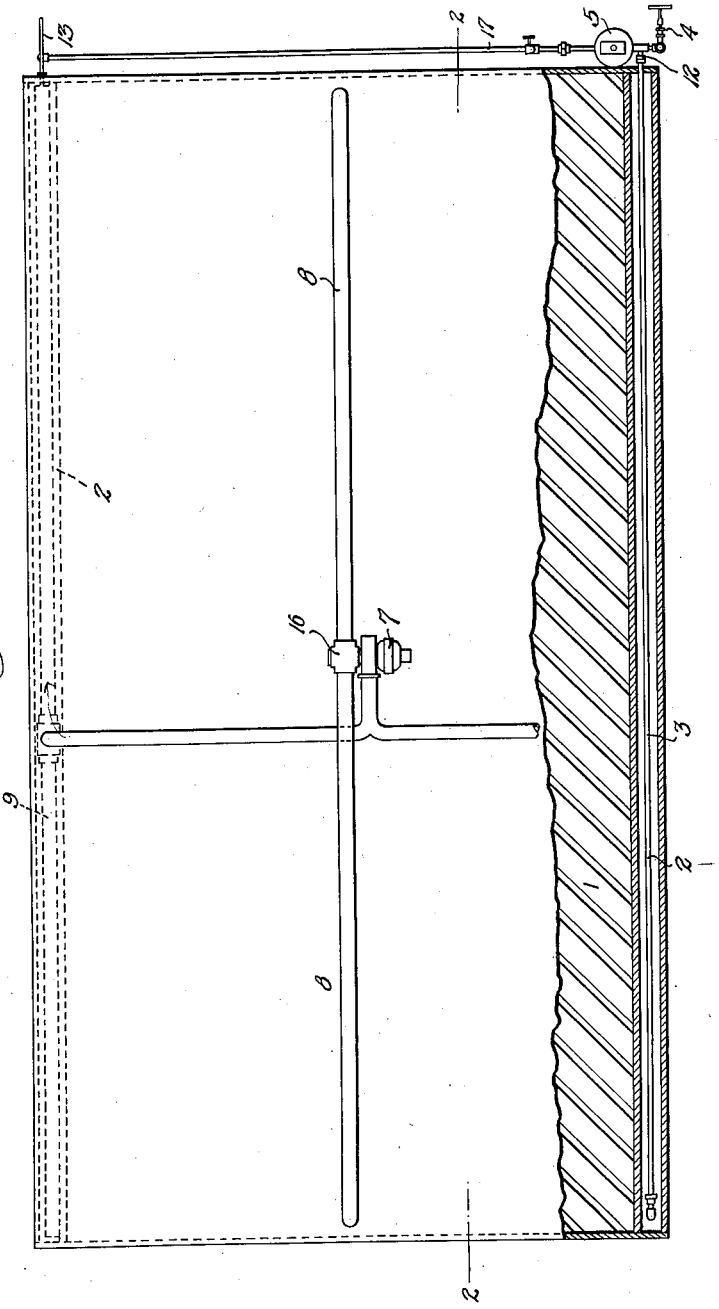

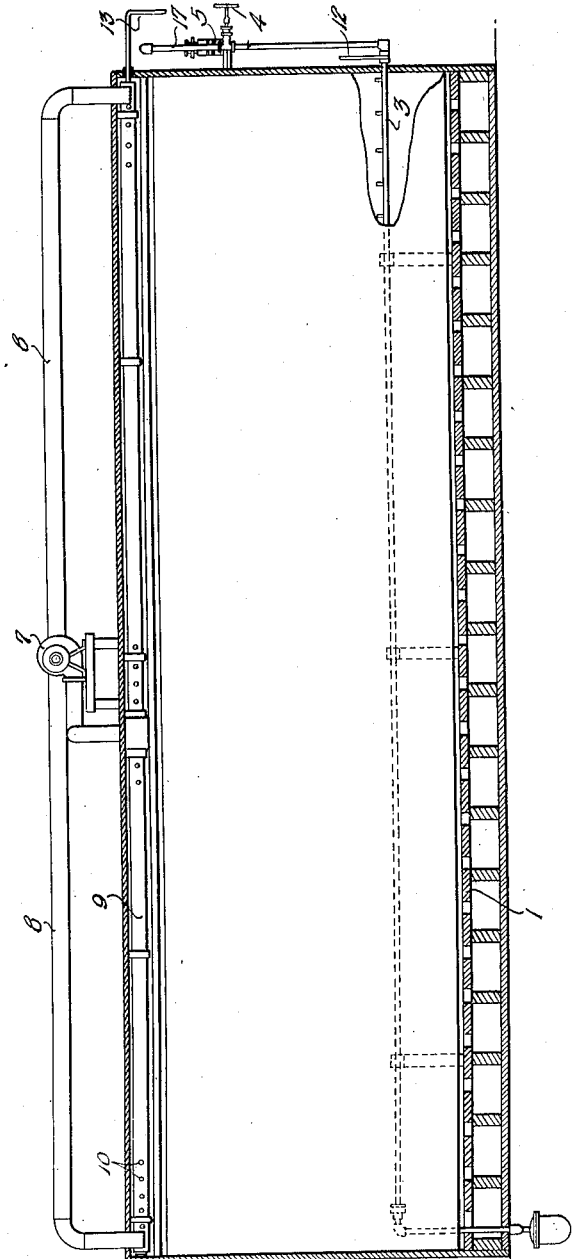

Sept. 19, 1933.     B. C. SKINNER     1,927,100
FRUIT COLORING ROOM
Filed April 19, 1930     3 Sheets-Sheet 3
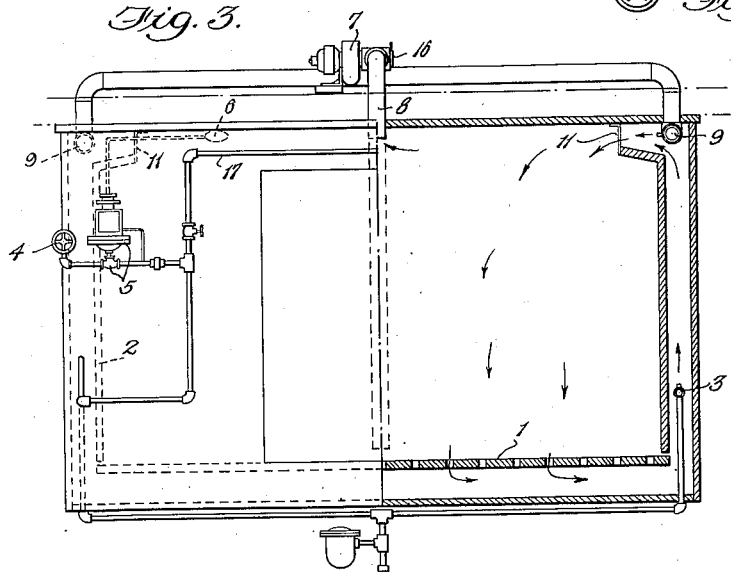
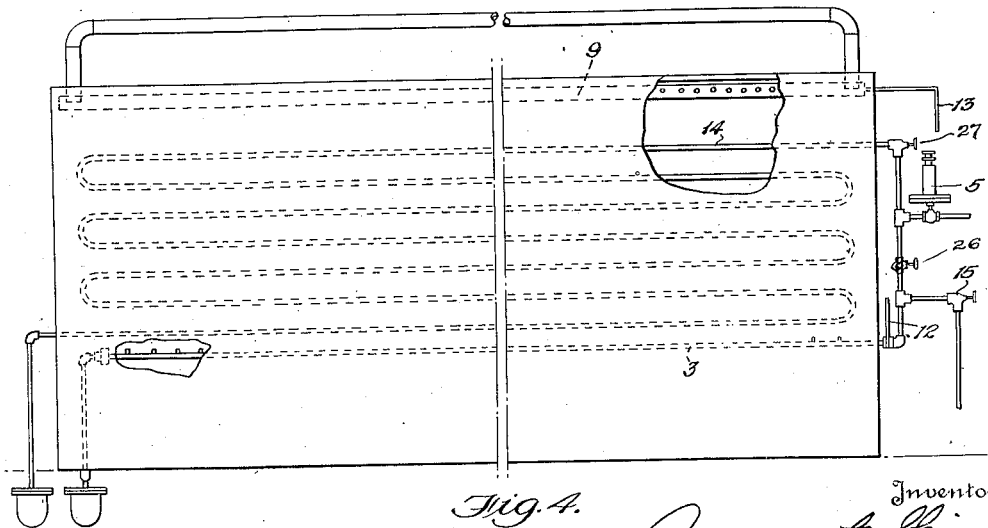

Patented Sept. 19, 1933

1,927,100

UNITED STATES PATENT OFFICE 1,927,100

FRUIT COLORING ROOM

Bronson C. Skinner, Dunedin, Fla., assignor to Food Machinery Corporation, San Jose, Calif., a corporation of Delaware Application April 19, 1930. Serial No. 445,775

16 Claims. (Cl. 99—2)

This invention relates to a method and apparatus for treating fruits of various kinds and especially refers to the coloring of all citrus fruits such as oranges, grapefruit, lemons, tangerines and many other fruits including bananas, that either normally have a green color or tend to turn green under certain temperature or climatic conditions, but which may be given a beautiful yellow or orange color through the controlled application of heat and moisture.

A number of reasons exist which make it necessary or desirable to color fruit by means of so-called coloring rooms where the coloring is done by the application of heat in the presence of proper humidity.

In the first place the buying public are not inclined to buy fruit having a green colored skin where it is thought the normally ripe fruit should be a bright orange or yellow color.

Some citrus fruits, though mature and edible may show a green coloring, which to the uninitiated seems to indicate that the fruit is not ripe, and usually such fruit will not normally change color except in contact with cold weather or by proper treatment in a coloring room.

Valencia oranges for example, which are fully ripe and show an orange color, if held late in the season will tend to turn green and start growing when warm weather comes in the spring. With this variety especially, a treatment in the coloring room brings back the natural ripe yellow color to the fruit and greatly aids in the marketing of the product.

Many and diverse methods have been employed to effect these results through subjecting the product to heat in the presence of moisture and certain gases, but they have met with only partial success due principally to the difficulties encountered in maintaining a proper heat and moisture condition throughout the entire room at all times while the process is in operation.

Fruit that is being treated is placed in the field boxes and is stacked four or five feet high in the room and usually almost fills the entire treating space, with of course such slight separating in stacking to permit of proper circulation of the air throughout the pack.

Until recently a uniform temperature of about 85° F. has given the best results, higher temperatures apparently tending to promote decay, which effects have been particularly noticeable when the heating is done by heat in the presence of certain gases.

During recent years the problem of sterilizing fruit for the destroying of any living organisms that might be in or on the fruit itself has made it necessary to increase the temperature to as much as 110° F. in these rooms, in which case the uniform temperature throughout the room is more important than it has ever been. It has been found too that these higher temperatures require a correspondingly higher humidity.

The thing paramount in a system of this sort is to establish and maintain a uniform temperature and humidity in every part of the coloring room so that the fruit near the ceiling, that near the floor, that in the corners and in the center of the pack receive substantially the same treatment as to time, temperature and humidity. If this is not accomplished then the treatment will not be uniformly successful. Some of the fruit will be over treated and some under treated with after results that will affect the marketing and sale of the product.

The method and apparatus disclosed in this application will permit of the uniform results necessary, being established and maintained throughout the treating period, and by such uniformity the actual time of treatment has been cut considerably, which is an important feature of the invention.

Generally considered the invention includes a specially constructed room in which the fruit to be treated is stacked in proper formation to permit the desired circulation. This room is provided with a slatted floor with the slats running in a diagonal direction so the boxes of stacked fruit will in no event completely cover any of the openings between slats, assuming they are always stacked parallel with the walls. Two opposite sides of the room are provided with false walls providing a circulation space from the floor to the ceiling. A blower system is placed over the room and connected therewith to provide the air circulation necessary. Steam pipes and an automatic control system are provided whereby live steam is admitted directly into the room, which steam element provides the necessary heat and humidity, no other heating or humidifying devices being necessary. The force of the entering steam also provides circulation in the room, which combined with the circulation provided by the blower system creates and maintains the proper circulation to produce and maintain the desired heat and humidity. The humidity is produced by addition of moisture directly to the air in the form of steam, the room thereby is quickly heated and the humidity quickly raised to the saturation point, the condensation settling on the cold fruit liberates its heat directly on the fruit so that it is not necessary to depend on heat by convection through the air. The automatic control of the steam inlet serves as a means of maintaining the desired temperature.

The blower system is normally intended to recirculate the air in the treating room but means are provided whereby a measured amount of fresh air is admitted to the blower to prevent smothering the fruit. This slight addition of fresh air added to the air of the room serves another important purpose. It creates a slight pressure in the room which effectually prevents leakage of air into the room from outside and thereby affecting the treating conditions. This slight pressure above atmosphere is just sufficient to cause a slight leakage out of the room through any cracks or crevices and thereby eliminates the development of cold spots or corners in the room which would occur if outside air gained admittance other than is provided for.

The admission of a small amount of outside air through the suction inlet of the blower, which is controlled by a suitable shutter will not affect the temperature or humidity. This small amount of normal air contacting with the air in the treating room will immediately absorb moisture from the fruit, lowering the temperature slightly and thereby causing the automatic steam regulator to function, admitting more steam which will automatically increase the humidity just lost through absorption and maintain the temperature and humidity.

When the coloring treatment has been concluded it is sometimes desirable to immediately cool the fruit to normal temperature and in performing the cooling step some of the same apparatus is used for this purpose that was used in the heating and humidifying steps.

During the cooling operation the steam is of course completely shut off. The doors and openings to the room may be opened; the inlet to the blower may be opened completely; the direction of the air jets from the blower system may be projected downward which will cause the cold air from the blower to pass downward behind the false walls at the sides of the room and up through the slatted floor into the stacked fruit and by coming into contact with the fruit the heat will be absorbed therefrom and this heated air will rise and pass out of one of the openings provided for its escape. Other cold air will also enter the room through any doors or openings provided. The cool dry air circulating in and around the fruit absorbs the moisture therefrom and quickly cools it and dries it.

There are numerous other advantageous features connected with the operation of this invention which will be more fully referred to as the description progresses.

It is therefore a principal object of the invention to provide a method of heating fruit coloring rooms wherein steam is liberated directly into the room without coming into contact with the fruit until mixed with the air.

It is also an object of the invention to provide mechanical circulation in a fruit coloring room and for liberating steam directly into the air circuit to thereby heat and humidify the air.

It is also an object of the invention to liberate live steam directly into air circulating into a fruit coloring room far enough in advance of the point at which the air contacts with the fruit to give the steam time to thoroughly heat and humidify and mix with the air so the fruit will not be scalded by contact with hot steam.

It is a further object of the invention to provide a blower system for circulating the air in a fruit coloring room with means for discharging steam directly into the suction side of the blower to thoroughly mix the air and steam before it contacts with the fruit.

It is also an object of the invention to provide a coloring room for coloring fruit by the application of heat and moisture wherein the floor is of slatted construction with blower suction means for drawing air through said slatted floor and projecting it downward onto the fruit in said room.

It is further an object of the invention to provide a room for coloring citrus fruits wherein one or more sides of the walls are of false construction with an air space through which air may be circulated for treating the fruit in the room.

It is a further object of the invention to provide a fruit coloring room wherein one or more false walls are provided with steam jets interposed in the spaces created thereby to project steam in the direction the circulation is desired.

It is also an object of the invention to provide means for circulating air through a fruit coloring room wherein a blower system is provided with means for admitting a measured quantity of air to the inlet of the blower from the outside thereby constantly adding fresh air to the quantity of air in the room.

It is a further object of the invention to provide a circulating system for a fruit coloring room wherein a slight pressure above atmosphere may be maintained during the treating period.

It is also an object of the invention whereby a heating system for a fruit coloring room may be provided that will be automatically controlled through the varying temperature of the room.

It is also an object of the invention to provide a controlled system of heating fruit in a coloring room whereby the fruit is heated by condensation of water vapor on the fruit.

It is also an object of the invention to provide means in a fruit coloring room whereby the direction of the air circulating therethrough may be changed at will.

It is also an object of the invention to supply additional moisture to that supplied by the condensation of the heating steam by admitting water to the steam to prevent super heat due to the orifice effect when high pressure steam is used.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it understood that the several necessary elements and combinations constituting the same may be varied in their proportions, placement, general arrangement and operative relation without departing from the nature and scope of the invention. In carrying out the objects of the invention in a concrete form or apparatus, further objects and advantages have been evolved than have been recited, and in order to make the invention more clearly understood there are shown in the accompanying drawings means and mechanism embodying the preferred structural arangement and the preferred disposition of the different parts and combinations, wherein I have simply illustrated one way of embodying the creative or concept part of the invention. The described devices are simply embodiments of the invention which other structures might also employ and some of the parts or combinations of parts may be used without the others in different types of apparatus without departure from the purview of my invention and I therefore regard myself as entitled to such variations from the shown and described devices as fall within the scope and meaning of the claims.

By reference now to the accompanying drawings which are merely illustrative and are not drawn to scale a clearer and more definite understanding of the invention may be had.

Fig. 1 is a plan of a coloring room partly in section showing the blower system arranged on top; one of the false walls in the sectional part; the arrangement of the blower pipes and one of the steam lines back of the false partitions.

Fig. 2 is a sectional elevation taken on approximately the lines 2—2 of Fig. 1 and shows the slatted floor construction; the vertical placement of one of the steam lines; the arrangement of the air distributor pipes in the ceiling and the means for turning the steam and air pipes on their axes to change the direction of flow of the steam or air.

Fig. 3 is an end elevation partly in section showing the location of the automatic steam control devices; the blower and pipes; the steam pipes back of the false partitions and other elements of the installation.

Fig. 4 is a side elevation of a coloring room intended to show principally an additional piece of equipment for use in the coloring rooms. This includes a heating coil to provide dry heat where desirable or control the humidity provided by the open steam jets. The steam jets alone provide high humidity while the coils alone provide low humidity.

The general structure of a coloring room embodying my invention would be substantially as follows: The floor 1 would be of slatted formation with the slats laid diagonally so that the boxes piled thereon parallel with the walls will at no time cover the slatted openings. 2 represents the false partition, preferably on two opposite sides of the room, but in certain installations they may be provided on only one side of the room. Within the space between the wall proper and the false partition is located rotatable pipes having jet openings for projecting steam jets either up or down the wall space according to the way they are turned. These pipes are indicated at 3. The steam supply would come in through the valve 4 and pass into the heating system through the control valve 5. The valve 5 would be controlled by the sensitive bulb 6 located at the ceiling level where the air would be the hottest.

In the drawings herewith I have shown the blower system located over the ceiling, but obviously this is not necessary but is a convenience as it shortens the pipes and makes for a more direct application of the air supply and circulation. 7 represents a blower of the usual type. The inlet pipe 8 is shown as drawing the air from the ceiling for recirculating, but I have indicated by dotted lines on Fig. 3 that the inlet or suction pipe can extend to the floor if desired. It should be mentioned that the suction of this blower is not heavy and is not sufficient to interfere with the proper circulation and falling of the cold air down through the slatted floor. The outlet pipes from the blower 7 lead to the top corner spaces of the chambers formed by the false partitions and the wall proper as at 9, these pipes have air jets 10 along their entire lengths, only a few are shown, and these air jets are pointed horizontally. At the top of the chamber formed by the partition 2 and the wall there is a restricted opening 11, Fig. 3, through which the air from the pipes 9 and the steam from the pipes 3 enters the room, a certain mixing taking place in this chamber before issuing through the opening 11. As the mixed air and steam enter the room there is an immediate downward tendency imparted thereto by the falling cold air passing down through the slatted floor, this air is cooled of course by contact with the cold oranges or other fruit being treated.

The downward movement is illustrated by the arrows in Fig. 3. The issue of steam through the jets in the pipes 3 will create quite a circulation throughout the coloring room and produces considerable suction along the slatted floor.

The air jets 10 in the air pipes 9 being placed horizontally and directly toward the openings 11 will maintain the circulation through the false chamber even if the steam is completely shut off. The issue of steam is of course variable on account of the automatic control of heat, while the room is cool the issue will be near the maximum but when the room reaches proper temperature the automatic control valve 5 will act to restrict the flow and only enough will issue through the jets to maintain the desired temperature. The natural condensation accumulating in the steam lines is taken care of by the several steam and water traps shown.

When the room is operating as a coloring room the jets in the pipes 3 are pointed upward and the jets in the air pipes 9 are pointing horizontally. After the coloring operation is completed it is desired to cool the fruit when the direction of these jets are changed, or during the coloring operation it may for some reason be desirable to change the direction of circulation. This change of direction of the air circulation is only necessary when it is desired to cool the fruit quickly.

In order to accomplish this change of flow of the air currents the air pipes are turned axially to point the jets in the desired direction.

Both the steam and air pipes are mounted to permit of axial rotation through the medium of slip joints which are not specifically shown as they constitute ordinary well known construction. The actual turning is accomplished by the handles 12 and 13.

In Fig. 4 there is shown a means of providing a combination of dry and moist heat. The steam pipe 3 is located below the heating coils 14 so that some dry heat will be added to the heat of the issuing steam and the humidity thereby controlled. A control valve 27 controls the heat in the coils. The control valve 26 controls the heat from the steam pipes. In operation when high humidity is desired valve 27 will be entirely closed and all of the heat supplied by the steam jets giving practically one hundred per cent humidity, except for the slight super heat due to orifice effect.

Provision is also made in this installation to provide added moisture to the steam to prevent superheating when the high pressure steam is used. 15 represents a water connection that will admit water into the steam pipe 3 and thereby supply the additional moisture desired.

The operation of a coloring system embodying my invention will be substantially as follows if the installation is as I have shown it in the accompanying drawings but may differ materially with a different arrangement and disposition of elements.

The fruit to be treated will be stacked in the room parallel with the walls and four or five feet high substantially completely filling the room, with a slight ceiling space to facilitate movement of the air currents over the top of the stacked boxes.

The room should now be closed tightly and the blower started with the pipes 9 having the air jets 10 pointing toward the openings 11 so the air will be projected out over the top of the stacked fruit. By means of the hand valve 4 steam is now admitted to the pipes 3, these pipes having the jets pointing upward will project the steam up into the air column generated by the issue of air from the pipes 9 and mixing therewith will heat the air as it issues through the opening 11 over the tops of the stacked boxes. The strong suction produced by the issuing steam in the chamber back of the false partition will create considerable suction under the slatted floor so that the cold air from the fruit will be pulled downward and circulated through this chamber remixing with new steam and being reheated thereby and recirculated through the fruit. When first opening the steam valve the control will be wide open and there will be a free flow of steam with a consequent strong suction under the floor.

As soon as the room begins to reach the desired temperature the control valve will begin to function and the steam will be gradually shut off, and when the desired temperature is reached the steam will be practically entirely shut off, but with a properly operating and adjusted control there will always be a small issue of steam to keep up the desired temperature.

By mixing the issuing steam with the air the air is heated and humidified and since very little new air is added, as will be referred to, it does not take long for the air being circulated to reach the desired temperature and humidity. The warm air circulating down through the fruit will give up its moisture by condensation on the fruit which heats the fruit directly with a heated element and greatly shortens the time necessary to treat a room full of fruit. This direct heating through hot condensation is a very important feature of my invention. Through experimentation I have found that it requires 8 hours with dry air to heat a single grape fruit to the center to a temperature of 110° with a normal temperature of 112° while with my system using a humidity of 100% it only requires 5 hours assuming an initial temperature of 80°. This reduction of treating time is due principally to the manner of liberating the heat of condensation directly onto the surfaces of the fruit.

Another important feature of operation that contributes largely to the success of my system is the maintaining of a slight pressure in the room above atmosphere. A treating room that may be said to be tight is not necessarily air tight and numerous cracks and crevices will leave in more or less of outside air which interferes more or less with proper circulation and produces cold spots that may never be properly heated. To obviate this I have provided means for admitting a small amount of outside air to the suction side of the blower. This additional air will create a slight pressure in the coloring room and cause a constant leakage of air out of the room through the cracks and crevices that would otherwise let air into the room. Through this means I am enabled to more quickly heat the air being handled and more uniformly than if outside air in varying quantities was constantly leaking into the room. The air I do admit is measured accurately and since no other air can enter the control is quite positive and regular. This slight addition of outside air is admitted into the suction side of the blower by means of an ordinary shutter as at 16 Fig. 3.

I have mentioned the addition of water to the steam to take care of superheating. This is provided for through the valve 15 admitting water directly to the steam line. I have also mentioned admitting steam directly to the suction side of the blower, this can be accomplished through the pipe line 17 as best shown in Fig. 3 which terminates just at the suction openings of the blower at the side of the room. Steam through this pipe is controlled by a suitable valve as shown. The important point is to be sure that the steam is uniformly distributed throughout the room.

In some instances the suction pipe may extend to the floor to draw the cold air therefrom instead of drawing it from near the ceiling, either way will be entirely satisfactory.

If it is desired to treat the fruit at a sterilizing temperature of 110° F. the temperature controls would be set at 112° as a safety factor to insure at least 110° of temperature. The heat control would be operated through expansion of the sensitive bulb 6 located near the ceiling of the room.

When the coloring treatment has been completed, if it is desirable to immediately cool the fruit, the steam valves are entirely closed. The air pipes 9 are turned so the jets point downward, all doors and openings into the room are opened, the blower is started and the shutter 16 may be completely opened. The air jets pointing downward into the space between the partition 2 and the wall will create a downward circulation and force the air up through the slatted floor when it will rise up through the fruit, absorb the heat and be picked up by the suction of the blower, or escape through some one of the openings in the room.

I mentioned in the forepart of this specification that certain gases had been and were being used in the presence of moisture to aid in the coloring process, with only partial success.

With my improved method and apparatus gases of various kinds, such as ethylene, may be quite successfully used to aid in the coloring process, and under some conditions of operation and state of ripeness of the fruit being treated the coloring is accomplished in a much better manner by the addition of a gas to the moisture laden air of the coloring room.

Any desired or suitable gas may be most easily distributed throughout the coloring by simply placing it at the suction side of the blower mentioned, when it will be drawn into the room with the air and distributed in a perfect manner. It can also be admitted in any other desired manner.

I wish it understood that this improved apparatus is amenable to a greatly varying degree in its adaptability to changing operating conditions so that anyone versed in the art will be able to obtain almost any results he desires in the coloring methods applicable to citrus and other fruits and substances.

Having thus described my invention what I claim as new and desire to secure by Letters Patent is:

1. A fruit coloring or sterilizing room containing a false floor and a false wall together forming an air chamber having upper and lower openings leading into said room, means including a blower for admitting air to said chamber, a rotatable steam pipe in said chamber having openings for projecting jets of steam toward said upper opening to force mixed steam and air into the room and thereby create a suction causing steam and air to be drawn from the room through said lower opening, and means for rotating said steam pipe to change the direction of the flow of steam.

2. A fruit coloring or sterilizing room containing a false wall having a restricted opening extending substantially the full length of the room and a false floor having slats running diagonally to the wall so that slatted fruit boxes will in no case cover all the openings between the slats, the wall and floor thus forming an air chamber at least partly surrounding the room, means including a blower for admitting air to said chamber near said restricted opening, a rotatable steam pipe in said chamber having openings for projecting steam toward said restricted opening to force mixed steam and air into said room and thereby create a suction under said slatted floor, means for rotating said steam pipe to change the direction of flow of steam, and means responsive to changes of temperature of said room for varying the amount of steam released from said steam pipe.

3. A room for coloring and sterilizing fruit and the like comprising a structure having a false floor and a false wall combined forming a circulating chamber having upper and lower openings into said room, means including a blower for admitting air into said room through said chamber, movable means in said chamber for admitting steam thereinto in a direction to produce an upward suction therein to draw air from said room through said lower opening, and discharge the mixture into the room through the said upper opening.

4. A room for coloring and sterilizing fruit and the like comprising a structure having a false floor and false walls thereby forming an air circulating and mixing chamber having upper and lower openings into said room, movable means in said mixing chamber for admitting a humidifying medium in a direction to cause an upward flow of air in said chamber to mix with air from said blower and escape into said room through said upper opening, part of said mixture passing to said false floor and recirculating through said chamber and another part of said mixture passing to the suction side of said blower to be recirculated into said room through said upper opening thereinto.

5. A room for coloring, sterilizing and cooling fruit and the like comprising a structure having false walls and a false floor, the floor being slatted and forming a lower opening into the chamber formed by said false walls, said chamber having also an upper opening into said room, means for circulating air and a humidifying medium through said chamber in both an upward and downward direction, the circulating of said medium causing a flow of air through said chamber and into said room according to the direction of circulation of said humidifying medium, one condition of circulation serving as a coloring medium and the other condition of circulation serving as a cooling medium.

6. A room for coloring, sterilizing and cooling fruit and the like comprising a structure having a slatted floor with a space thereunder, false walls opening into the space under said slatted floor, and forming a chamber for mixing and circulating a fruit coloring or a fruit cooling medium, said chamber having an opening into the top of said room, movable means in said chamber for projecting a medium vertically upward through said chamber, or for projecting a medium vertically downward through said chamber, said medium in either instance circulating through said room, a blower for projecting a medium into said room through the upper opening from said chamber to mix with medium flowing from said chamber and having a suction from near the top of said room remote from the opening from said chamber.

7. A room for coloring fruit and the like comprising a structure having false walls and a false floor, a blower arranged to project air into the top of said room and for drawing air from another part of said room, a chamber formed by said false walls and having lower and upper openings into said room, the lower opening being through the said slatted floor, means associated with said blower to admit a predetermined amount of fresh air into the circulating medium flowing through said room to assist in maintaining a constant condition of the circulating medium, means in said chamber formed by said false walls for controlling and changing the direction of flow of medium therethrough and for imparting heat and humidity thereto, whereby the treating medium is maintained in a uniform consistency throughout said room.

8. A room for coloring and sterilizing and cooling fruit and the like comprising a structure having double walls with a space therebetween forming mixing and circulating chambers, a slatted floor spaced to form a chamber thereunder and connected with the mixing and circulating chambers to form a lower opening into said room of substantially full room area, each of said wall chambers opening into the top of said room, a blower arranged to draw air from the top center of said room and to project air into said room through the upper openings from said mixing chambers, means in said mixing chambers for creating a circulation upward or downward as may be desired, and when projected upward to mix with air from the discharge of said blower and if downward to pass into the suction side of said blower.

9. A room for coloring fruit and the like comprising a structure having a false floor and false walls forming a chamber through which a fruit treating medium may be circulated into and out of said room, a blower for producing a circulation of treating medium into and through the top of said room, movable means in said chamber formed by said false walls for mixing and circulating a treating medium into the top of said room and out of the bottom thereof, the medium from said chamber mixing with the medium from said blower to enter the top of said room, the medium circulating in said chamber dividing, a part passing to the suction side of said blower and the other passing through the said slatted floor to the mixing chamber, both for recirculation through said room, with means for heating and humidifying said medium and means for automatically controlling the same.

10. A room for coloring fruit and the like and then cooling the fruit in the same room comprising a structure having a false floor and false walls forming a mixing and circulating chamber on opposite sides of the room and under the floor, the side chambers having openings into the top of the room, a blower discharging into the tops of the side chambers adjacent the openings into the room, movable means in the side chambers for heating and humidifying the air therein and creating a circulation therethrough either toward the top openings or toward the slatted floor and the space thereunder, the heating and humidifying being in advance of the medium contacting with the fruit in the room.

11. A room for coloring and treating fruit and the like comprising a structure having spaced side walls and a space under a slatted floor, said spaces forming a mixing and circulating chamber covering three sides of said room and having access to the top of said room through openings from the tops of said side spaces, a blower for projecting a treating medium into said room, means for injecting steam into the suction side of said blower to heat and humidify the air flowing therethrough and to have said mixture complete before contacting with the fruit in said room, means in the spaces between said side walls to project a medium therethrough to mix with medium flowing from said blower as it passes into said room, the circulation through said room dividing, the top portion flowing into the suction of said blower for recirculation and the rest flowing through said slatted floor due to a suction produced in said side spaces for recirculation, with means for supplying a predetermined amount of fresh air to the circulating medium.

12. A room for coloring and otherwise treating fruit comprising a structure having a slatted floor with a space thereunder and having double walls with spaces therebetween, all of said spaces intercommunicating, the side wall spaces communicating with said room through opening near the top, said room being sealed against ingress of air except through said blower, means associated with said blower to provide a small amount of fresh air to thereby produce a slight internal pressure in said room during the treating period, with means in said wall spaces for heating and humidifying the air passing therethrough into said room.

13. A room for coloring and treating fruit and the like comprising a room having a slatted floor and double walls, intercommunicating spaces under said floor and between said side walls, openings at the top of said side walls into said room, means in said spaces to project high pressure steam thereinto and a predetermined amount of water to supply additional moisture to that produced by the condensation of the steam to counteract the superheating effect of the steam passing through the orifices, a blower for circulating medium through said room and mixing with the medium in said side spaces before entry into said room, with automatic means for controlling the admission of steam into said spaces.

14. A room for coloring fruit and the like through a heated medium comprising a room having double walls with spaces therebetween and a slatted floor with a space thereunder, said spaces being intercommunicating, means in said spaces for humidifying the air circulating therethrough and heating the same, a blower for circulating air through said room to contact with the fruit stored therein and whereby the fruit will be heated by condensation of water vapor thereon, with automatic means for controlling the heating and humidifying medium.

15. A room for coloring fruit and the like comprising a structure having a false floor and false walls forming a mixing and circulating chamber on opposite sides of the room and under the floor, the side chambers having openings into the room for substantially the entire width thereof, a blower discharging air into the tops of the side chambers toward the openings into the room, means in the side chambers for humidifying the air therein and producing a circulation therethrough toward the top openings into the room, the humidifying being in advance of the air contacting with the fruit in the room.

16. A room for coloring fruit and the like through a heated medium comprising a room having double walls with spaces therebetween and a slatted floor with a space thereunder, said spaces being intercommunicating, means in said spaces for humidifying the air circulating therethrough and heating the same, air passages connecting the wall spaces with the said room and extending substantially the width of the room and at the top thereof, means for injecting treating medium into said room through said air passages at the top thereof to cause an induced circulation downwardly through said room and upwardly through said wall spaces to contact with fruit stored in said room for treatment.

BRONSON C. SKINNER.